United States Patent
Koneru et al.

[19]

[11] Patent Number: 5,966,705
[45] Date of Patent: Oct. 12, 1999

[54] TRACKING A USER ACROSS BOTH SECURE AND NON-SECURE AREAS ON THE INTERNET, WHEREIN THE USERS IS INITIALLY TRACKED USING A GLOBALLY UNIQUE IDENTIFIER

[75] Inventors: Sudheer Koneru, North Bend; Michael H. Tuchen, Seattle, both of Wash.

[73] Assignee: Microsoft Corporation, Redmond, Wash.

[21] Appl. No.: 08/885,324

[22] Filed: Jun. 30, 1997

[51] Int. Cl.$^6$ ........................................ G06F 17/30
[52] U.S. Cl. ........................ 707/9; 707/10; 375/200.33
[58] Field of Search ..................... 707/1, 10, 9, 3, 707/104, 2, 6, 7, 8, 100, 102, 200, 201, 501, 513; 395/200.32, 683, 187.01, 188.01, 200.57, 200.54, 200.59, 200.33; 380/23, 29

[56] References Cited

U.S. PATENT DOCUMENTS

| | | | |
|---|---|---|---|
| 5,425,102 | 6/1995 | Moy | 380/25 |
| 5,522,077 | 5/1996 | Cuthbert et al. | 395/683 |
| 5,684,951 | 11/1997 | Goldman et al. | 395/188.01 |
| 5,689,566 | 11/1997 | Nguyen | 380/25 |
| 5,696,898 | 12/1997 | Baker et al. | 395/187.01 |
| 5,708,780 | 1/1998 | Levergood et al. | 395/200.59 |
| 5,712,979 | 1/1998 | Graber et al. | 395/200.54 |
| 5,754,939 | 5/1998 | Herz et al. | 455/4.2 |
| 5,761,499 | 6/1998 | Sonderegger | 395/610 |

OTHER PUBLICATIONS

Van Name et al., "Web Security and the Cookie Controversy," *PC Week* (Jul. 1996) (1 page).

Russell Davis, Network Authentication Tokens, IEEE 1990 and 234–238, Mar. 1990.

*Primary Examiner*—Paul R. Lintz
*Assistant Examiner*—Srirama Channavajjala
*Attorney, Agent, or Firm*—Klarquist Sparkman Campbell Leigh & Whinston, LLP

[57] ABSTRACT

A system and method is disclosed for tracking a user across both secure and non-secure areas on an Internet and/or Intranet site. In one aspect of the system and method, when a user first accesses a non-secure area, such as a public area, the user is assigned a token, such as a globally-unique identifier (GUID). The token is used as a key to a database entry on a server computer for tracking the user in non-secure areas. When the user first accesses a secure area, the user is prompted to enter a user identification and a password. The user identification is then used as the key to the database entry, rather than the token. The server then uses the user identification to track the user across both secure and non-secure areas.

25 Claims, 5 Drawing Sheets

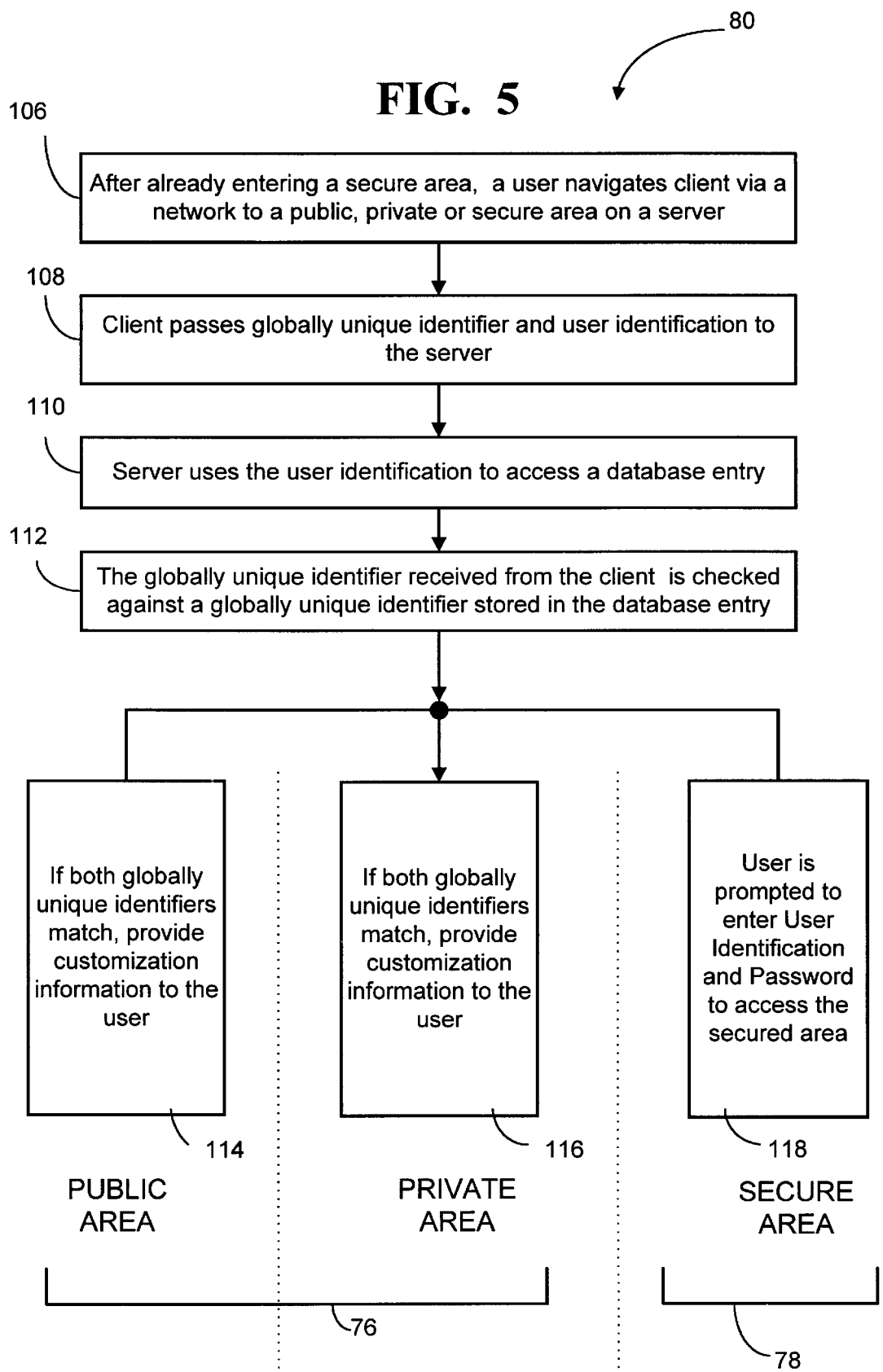

TRACKING A USER ACROSS BOTH SECURE AND NON-SECURE AREAS ON THE INTERNET, WHEREIN THE USERS IS INITIALLY TRACKED USING A GLOBALLY UNIQUE IDENTIFIER

FIELD OF THE INVENTION

This invention relates generally to tracking a user on a computer network, such as an Internet or Intranet network, and, in particular, to tracking a user across secure and non-secure areas within a site on the computer network.

BACKGROUND AND SUMMARY OF THE INVENTION

The Internet is a well-known, global network of cooperatively interconnected computer networks. The world-wide web portion of the Internet is a collection of server computers (referred to as "sites") that store documents which are typically accessible by the public. The Intranet uses similar protocols and has a similar user interface to the Internet. The Intranet, however, restricts access to a network by users outside of a defined group, such as users who are not employees of a corporation. Hereinafter, any description of the Internet also is applicable to Intranet, unless otherwise specified.

Software generally known as "browsers" is now in widespread use for retrieving (also known as "downloading") documents (also known as "web pages") from the world-wide web and viewing such documents in hyper-text markup language (HTML) format. These HTML documents generally include text, HTML "tags" that specify the format of a document, and links (referred to as "hyper-links") that point to related documents on the network and other files containing information (e.g., sound, images, video, etc.) to be combined into the document. In use, a browser allows a user to navigate (also known as "browse") between documents and sites on the world-wide web.

Software object components also may be incorporated into the HTML documents for displaying executable content, such as for animations or information processing. Currently, most Internet browsers support embedded software object components in the form of ActiveX controls, Java applets, and Visual Basic Scripts. These software object components are inserted into HTML documents using the <Insert> or <Object> HTML tags.

Security on Internet and Intranet sites is becoming increasingly important. For example, sites may contain public information, which anyone can access, and proprietary information, which only selected users can access. Accordingly, some sites are now maintaining non-secure and secure areas. A non-secure area includes a public area, in which a user can browse without restrictions, and a private area that is open to users passing through a one-time registration process. A secure area, on the other hand, requires a user to enter a user identification and a password each time the user enters the secure area. While the private and secure areas provide at least some level of security, the public area provides no security whatsoever.

In some situations, users that are accessing sites also desire security so that they are not impersonated by other users. For example, many sites are storing information relating to a user's browsing characteristics, such as what links the user activated, how often the user accesses the site, and how long the user remained on a particular web page. Additionally, sites may store customization information. For example, a document may be displayed to the user having customization options relating to news, sports, entertainment, etc. Based on the options the user selects, the document only displays content related to those selected options. Moreover, the site retains the user-selected options so that the customization information is re-displayed when the user re-accesses the same document at a later time. Storing information relating to user activity or storing customization information for a user is called "tracking" a user. Users want to ensure that a site is not tracking an impersonator of the user, thereby providing the impersonator with access to the user's private customization options.

To store user information, such as customization information, many sites have a database entry for each user that is accessible using globally unique identifiers ("GUID"). The GUID is a 128-bit string that uniquely identifies each user. The GUID is created by a server when a user first accesses a web site and is stored on the client computer in a small amount of local storage (i.e., local to the client computer) often called a "cookie." When a user returns to the web site, the browser searches local storage to determine if it has a cookie for that web site. If so, the browser transmits the cookie to the server. Typically, however, GUIDs are only used to track users in non-secure areas. In secure areas, on the other hand, sites track the user's activity using the user identification (rather than the GUID) that was entered by the user to access the secure area.

These differing techniques for tracking the user across secure and non-secure areas require multiple data storage areas for a single user. Maintaining such multiple storage areas is expensive, especially considering the volume of users accessing Internet sites. Additionally, storing user information in a database entry based on the user identification provides little security, as a user identification is often easy to guess (i.e., many users use their first name or their spouses name as a user identification). Storing user information based on the GUID also has problems since the GUID uniquely identifies a client computer and not the user. For example, if the user connects to a site from different computers (e.g., home and work computers), the site will store multiple database entries for a single user since each computer has a different GUID associated with it.

To overcome these shortcomings, a system and method is provided for tracking a user across both secure and non-secure areas on an Internet and/or Intranet site using a single database entry. Additionally, the system and method provides a heightened level of security in non-secure areas.

In one aspect of the invention, when a user first accesses a non-secure area on a site, such as a public area, the user is assigned a token, such as a GUID, that uniquely represents the user. The token is used as a key to a database entry associated with the user on the site, as described above. When the user first accesses a secure area on the same site, the user is prompted to enter a user identification and a password. After receiving this information, the site uses the user identification, rather than the token, as the key to the database entry across both non-secure and secure areas. The user identification is then stored in a cookie and is received by the site each time the client computer passes the cookie to the site. Thus, using the user identification as a key, only one database entry is needed to track users across both non-secure and secure areas.

In another aspect of the invention, additional security is provided by storing a copy of the token in the associated database entry. When the user accesses the site and the site receives the cookie from the client computer, the copy of the token in the database entry is compared to the token stored in the cookie. If the tokens match, then the user is considered authentic. The user may then be provided with documents that are customized according to customization information stored in the user's is database entry. If the tokens do not match, either an error is generated or the user is provided with generic, uncustomized documents.

Additional features and advantages of the invention will be made apparent from the following detailed description of an illustrated embodiment which proceeds with reference to the accompanying drawings.

BRIEF DESCRIPTION OF THE DRAWINGS

FIG. 5 is a flow diagram of a tracking method, for tracking a user across both non-secure and secure areas after the user accesses a secure area.

DETAILED DESCRIPTION OF AN EMBODIMENT

Overview of Client and Server Computers

Figure 1:
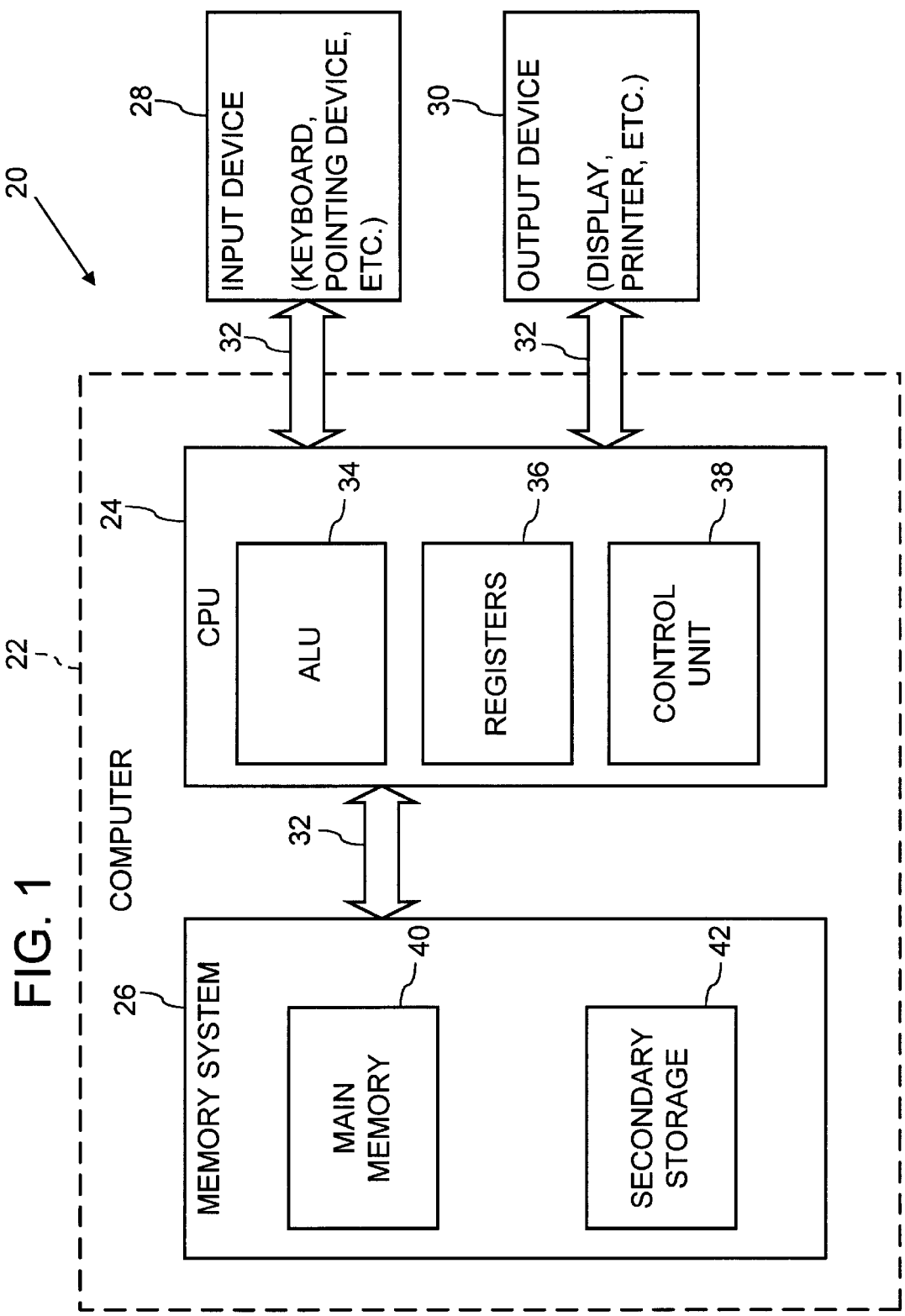
FIG. 1 is a block diagram of a computer system used to implement a method and apparatus embodying the invention.

Referring to FIG. 1, an operating environment for an illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The in put and output devices 28, 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26. Preferably, the operating system employs a graphical user interface where the display output of an application program is presented in a rectangular area (sometimes referred to as a "window") on the screen of the output device 30 and is also multi-tasking (allowing application programs to execute computing tasks in multiple threads), such as Microsoft Corporation's Windows® 95 or Windows® NT operating system, IBM's OS/2 Warp operating system, Apple's Macintosh System 7 operating system, X-Windows, etc.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

System Overview

Figure 2:
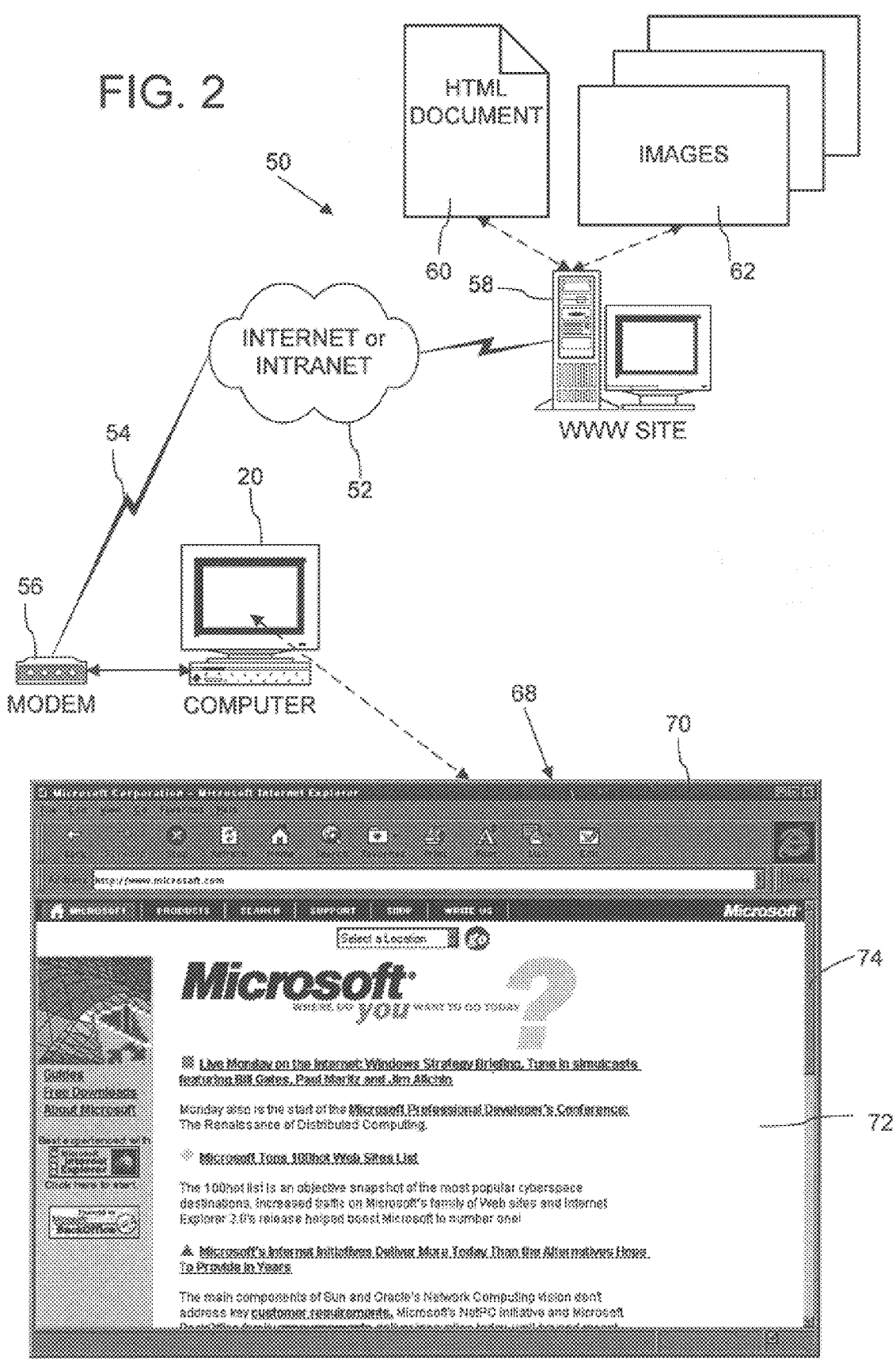
FIG. 2 is a block diagram of the computer system of FIG. 1 connected to a remote computer network (e.g., the Internet) for locally browsing electronic documents residing at a remote computer site.

FIG. 2 shows a browsing environment 50 in which computer 20 (FIG. 1) as a client runs software, referred to herein as a "browser," for unified browsing of electronic documents and other data from local sources (e.g., the secondary storage 42 of FIG. 1) and from a remote computer network 52. The browser can be integrated with the operating system software, or can be separate application software. The illustrated remote computer network 52 may be the Internet or the Intranet. In the illustrated browsing environment 50, the computer 20 connects to the computer network 52 over a telephone line 54 with a modem 56. Other physical connections to the computer network alternatively can be used, such as an ISDN, T1 or like high speed telephone line and modem, a television cable and modem, a satellite link, an optical fiber link, an Ethernet or other local area network technology wire and adapter card, radio or optical transmission devices, etc. The invention can alternatively be embodied in a browsing environment for other public or private computer networks, such as a computer network of a commercial on-line service or an internal corporate local area network (LAN), an intranet, or like computer network.

Documents for browsing with the illustrated browser can reside as files of a file system stored in the computer's secondary storage 42 (FIG. 1), or reside as resources at a remote computer 58 (also referred to as a "site" or server) connected to the computer network 52, such as a World-Wide Web site on the Internet. The illustrated document 60 residing at the site 58 conforms with HTML standards, and may include extensions and enhancements of HTML standards. However, the illustrated browser also can browse documents having other data formats (e.g., Microsoft® Word documents, etc.) from the computer 20 or remote computer 58. In conformance with HTML, the illustrated document 60 can incorporate other additional information content 62, such as images, audio, video, executable programs, etc. (hereafter simply "images" 62), which also reside at the remote computer 58. The document 60 and images 62 preferably are stored as files in a file system of the remote computer 58. The document 60 incorporates the images 62 using HTML tags that specify the location of files or other Internet resource containing the images on the Internet 52.

When used for browsing documents, the illustrated browser displays the document in a window 68 or rectangular area of the computer's display 30 allocated to the browser by the operating system. The illustrated window 68 comprises a frame 70, a document display area 72, and user interface controls 74. The browser displays the document within the document display area 72 of the window 68.

Client Identifier

When the client computer 20 connects to the server 58, a token, such as a GUID, is assigned to the client and stored locally as a client identifier (not shown), often called a "cookie," as is further described below. A database entry is also created and stored on the server computer 58 to track user activity as the user browses through different areas on the server computer. By "tracking" it is meant that selected characteristics of the user's browsing activities are recorded or the user is provided with customization information that was previously stored. Such information is stored in the database entry and the token is used as a key for accessing the database entry. Use of a key in a database is well understood in the art as being an attribute that is chosen as the primary means of accessing an entity (e.g., the database entry).

A client identifier or cookie is generally arbitrary text information (e.g., of up to 255 characters) returned to user client 20 by server 58 when it is accessed by user client 20. The information includes one or more network addresses (e.g., Uniform Resource Locators, URLs) indicating servers that the user accessed using the browser. Such information is stored in the client identifier on client 20. On subsequent accesses of any of the specified network addresses by the browser on user client 20, selected information in the client identifier is returned to server 58. A benefit of using a client identifier to carry the information is that it is automatic and transparent to the user.

A client identifier is specified by a Set-Cookie HTTP response header of the form:

Set-Cookie: name=VALUE; expires=DATE; path=PATH;domain=DOMAIN_NAME; secure.

For example, when it requests an HTML document from a network address on server 58, the browser determines whether the address matches or corresponds to the addresses or paths specified in any of the stored information within the client identifier. For each match, the browser transmits the name and value of the information within the client identifier with the HTML document request. The format of the transmission is:

Cookie: name1=VALUE1; name2=VALUE2; . . .

The attributes of the Set-Cookie header are:

name=VALUE

This attribute specifies the name and content of the client identifier data and is the only required attribute on the Set-Cookie header. The name and its value can be any sequence of characters, except semi-colon, comma and white space. For example, this attribute can have the name 'User' and the content or value can be a 128-bit GUID referenced to the time the user accesses the network address.

expires=DATE

This attribute specifies an expiration date for selected information within the client identifier. After expiration, the information within the client identifier is no longer stored or returned to the server at the originating network address. The DATE is formatted as:

Wdy, DD-Mon-YYYY HH:MM:SS GMT

If this attribute is not set, then the information within the client identifier expires immediately after leaving the specified network address. Accordingly, this attribute is set to allow customization information to be retrieved for a user during subsequent accesses of the specified network addresses.

domain=DOMAIN_NAME

This attribute specifies a top level or "tail" domain to be initially examined when searching for a valid client identifier. The top level or "tail" domain requires at least three periods, such as ".custom.home.uk," except that only two periods are required in the top level domains "com", "edu", "gov", "int", "mil", "net", and "org". A client identifier with a matching top level domain match proceeds to path matching. The default value of this attribute is the host name of the server generating the client identifier.

path=PATH

The path attribute specifies the network addresses (e.g., URLS) within a domain for which the client identifier is valid (i.e., returned by the browser on user client 20 when the specified network address is requested or accessed). The format for this attribute is 'path=/foo', and the client identifier is returned only if the browser requests a network address (e.g., URL) in the path '/foo' or lower, such as '/foo/default'. The most general specification is 'path=/'. If this attribute is not specified, the default path is the same as the path for the document with which the client identifier is associated.

secure

If this attribute is set, the client identifier is transmitted from user client 20 only if the communication channel with server 58 is secure (e.g., utilizing a secure socket layer). If this attribute is not specified, the client identifier is sent regardless of the security of the channel.

Method of Tracking Prior to Entering the Secure Area

Figure 3:
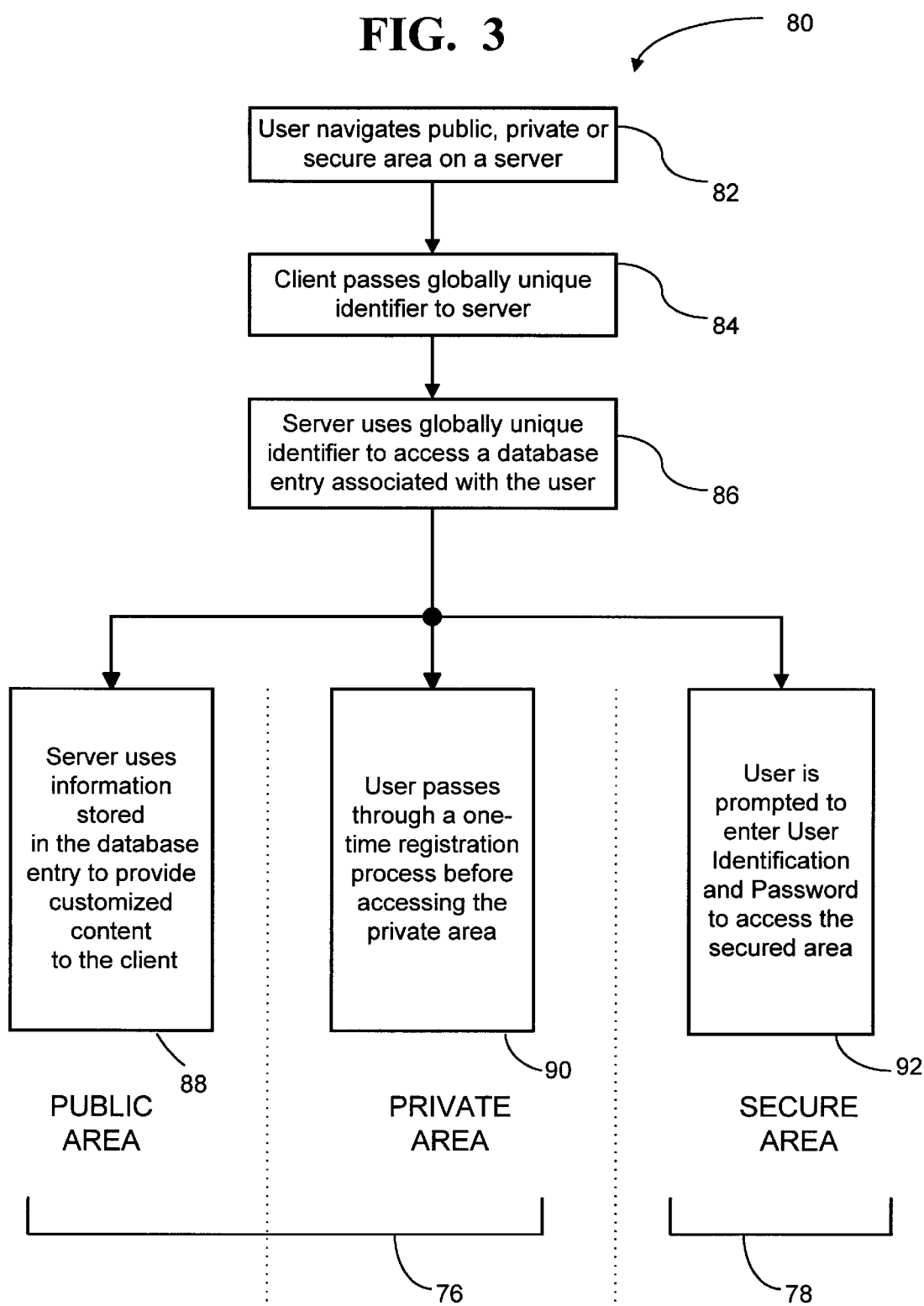
FIG. 3 is a flow diagram of a tracking method according to the invention for tracking a user prior to and upon entering a secure area on the remote computer site.

Turning to FIG. 3, the illustrated site 58 includes a non-secure area 76 and a secure area 78. The non-secure area 76 includes a public area and may also include a private area, although a private area is not required to implement the system and method according to the invention. In the public area, a user can browse through documents without restriction, while the private area is open only to users passing through a one-time registration process. The secure area 78 requires a user to enter a user identification and a password each time the user enters the secure area.

Using the present invention, the method of tracking a user depends upon whether the user has accessed a secure area 78. Prior to accessing a secure area 78, the server 58 tracks the user based upon the GUID stored in the client identifier on the client computer 20. After the user has accessed the secure area 78, the system tracks the user based upon a user identification entered by the user.

FIG. 3 shows a method of tracking 80 prior to a user accessing the secure area 78. Process block 82 indicates that a user navigates client 20 to a network address (e.g., Uniform Resource Locator) so that a document, such as document 60 (FIG. 2), is displayed in window 68 of the client computer 20. If this is the first time the user has accessed server 58, a GUID is generated, and the Uniform Resource Locator for the server and the GUID are placed in the client identifier on the client computer 20. Additionally, a new database entry on the server 58 is opened for the client using the GUID as a key to accessing the database. Assuming, however, that the user has already accessed the site 58 and that a GUID has been stored in the client identifier, the client 20 passes the GUID to the server (step 84).

Process block 86 indicates that the server 58 uses the GUID to access a database entry associated with the user. The database entry contains information relating to the user. For example, the entry may record the user's activities or the entry may contain information needed to customize documents displayed to the user.

Process blocks 88, 90 and 92 indicate actions taken when a user enters a public area, a private area, or a secure area, respectively. Process block 88 shows that a user accessing a public area may be shown customized documents based on customization the user previously selected that is stored in the database entry.

Process block 90 indicates actions taken by the server when the user accesses a private area on the server 58. The server 58 checks the database entry associated with the user by using the GUID as a key, as described above. The server then checks a registration field in the database entry that indicates whether the user has previously registered. If the user has not registered, the user must go through a registration process. Usually the registration process requires the user to enter personal information or requires the user to answer questions. After having registered, the registration field in the database is changed to indicate that the user has now registered. If the user leaves the private area and returns, the server 58 again checks the database entry and determines that the user has already registered. As a result, the user is given automatic access to the private area without further registration. Such registration checking is transparent to the user.

Process block 92 indicates actions taken when the user tries to access a secure area on the server 58. The server 58 displays a document to the user that requests a user identification and password. Additionally, if the user has not previously entered a user identification and password, the user is offered a sign-up process through which the user must pass in order to enter the secure area. If the user previously entered a user identification and password, it is stored in the database entry. Upon entering the proper user identification and password, the server 58 compares the user-entered user identification and password to that stored in the database entry. Only if the two match, is the user allowed to access the secure area.

Steps Taken upon Entering the Secure Area

Figure 4:
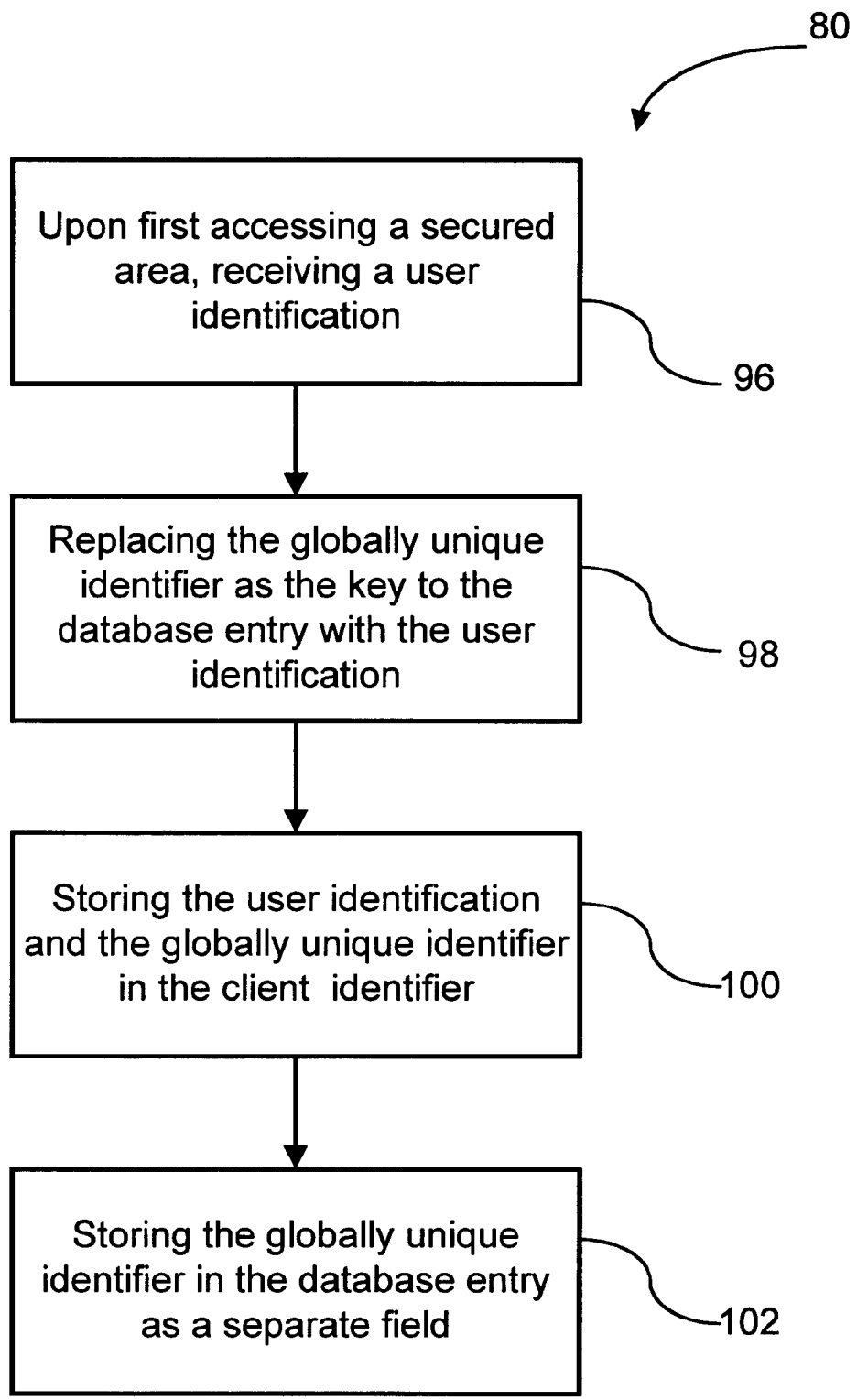
FIG. 4 is a flow diagram of steps taken by the tracking method after the user enters a secure area.

FIG. 4 shows additional steps in the method of tracking 80 after the user accesses the secure area. Process block 96 shows that the server 58 receives the user identification entered by the user.

Process block 98 shows that the server no longer uses the GUID as the key to the database entry. Instead, the GUID is replaced as the key with the user identification entered by the user.

Process block 100 shows that the user identification and the GUID are both stored in the client identifier or cookie on the client computer 20. The user identification can be stored in the "name=VALUE" attribute described above. Alternatively, the user identification can be stored in other attributes described above or other attributes can be created for storing the user identification.

Process block 102 indicates that the GUID is separately stored in a field within the database entry. This field is used for a comparison with the GUID subsequently sent from the client computer 20, as is further described below.

Method of Tracking after Entering the Secure Area

FIG. 5 shows the tracking method 80 as a user enters public, private and secure areas after the key is switched from the GUID to the user identification.

Process block 106 indicates that the user is browsing a public, private or secure area after having previously entered a secure area.

Process block 108 indicates that the client 20 passes the client identifier, which includes the GUID and the user identification, to the server 58.

Process block 110 indicates that the server 58 uses the user identification as a key to accessing the database entry associated with the user. Thus, user information stored in a database entry can be accessed to provide customized content to the user or additional information about the user's browsing characteristics can be stored in the database entry. The database entry also has a field that includes a GUID which is stored as shown in process block 102 (FIG. 4).

Process block 112 indicates that the GUID stored in the client identifier and received from the client is compared to the GUID stored in the database entry.

Process blocks 114 and 116 represent actions taken by the server 58 in the public and private areas, respectively. In both process blocks 114 and 116, if the GUID's checked in process block 112 are equivalent, the user is provided customized content that is stored in the database entry. If the GUIDs are different, the user is either presented with an error or generic, uncustomized content. Thus, a heightened level of authentication is achieved by ensuring that the user's customized data is not displayed unless the check shows that the user is genuine.

Process block 118 shows that the user must still enter a user identification and password to enter the secure area.

Having illustrated and described the principles of the invention in a preferred embodiment, it should be apparent to those skilled in the art that the embodiment can be modified in arrangement and detail without departing from such principles.

For example, although the system and method is described as having the user identification and GUID within the same client identifier, they may be stored in separate client identifiers.

Additionally, although the token associated with the client computer is described as the GUID, other tokens for identifying the client computer may be used.

In view of the many possible embodiments to which the principles or invention may be applied, it should be recognized that the illustrated embodiment is only a preferred example of the invention and should not be taken as a limitation on the scope of the invention. Rather, the invention is defined by the following claims. We therefore claim as the invention all such embodiments that come within the scope of these claims.

We claim:

1. A method of tracking a user on a client computer as the user accesses secure and non-secure areas on a network server computer, comprising the steps of:

upon first accessing a non-secure area, assigning a token representing the user wherein the token does not contain a user identification and using the token as a key for accessing a database entry associated with the user on the server computer;

upon first accessing the secure area, receiving a user identification associated with the user;

after accessing the secured area, replacing the token with the user identification as the key to the database entry; and the database entry including customization information associated with the user.

2. The method of claim 1 further including:

storing the token, the user identification, and a network address associated with the server computer in local storage on the client computer; and receiving the token and the user identification from the client computer upon subsequent accessing by the user of the network address.

3. The method of claim 2 further including:

upon first accessing the non-secure or secure areas on the server computer, storing customization information associated with the user in the database entry;

upon subsequent accessing of the non-secure or secure areas, retrieving the customization information stored in the database entry by using the user identification to access the database entry; and returning to the client computer, a document customized according to the customization information.

4. The method of claim 3 further including:

storing a copy of the token within the database entry;

upon subsequent accessing of the server computer, comparing the copy of the token stored in the database entry to the token received from the client computer;

if the tokens match, returning a document customized according to the customization information to the client computer; and if the tokens do not match, returning a generic, uncustomized document to the client computer.

5. The method of claim 1 further including:

during first accessing of the server computer, obtaining customization information from the user; and storing the customization information in the database entry.

6. The method of claim 5 further including:

prior to accessing the secure area:
  (a) receiving the token from the client computer;
  (b) accessing the database entry on the server computer using the token; and
  (c) returning a document to the client computer that is customized in accordance with the customization information stored in the database entry;

after accessing the secure area:
  (a) receiving the user identification and the token from the local storage on the client computer;
  (b) accessing the database entry on the server computer using the user identification; and
  (c) checking the token received from the client computer by comparing the token to information stored within the database entry.

7. The method of claim 1 wherein the non-secure area includes a public area and a private area.

8. The method of claim 1 wherein the token is a globally unique identifier.

9. The method of claim 6 further including:

upon first accessing the private area, requesting registration information and storing information in the database entry indicating that the user has registered.

10. The method of claim 9 further including:

upon subsequent accessing the private area, checking the database entry to verify that the user previously registered, and if the user already registered, allowing the user to access the private area without further registration.

11. The method of claim 1 further including requesting a user identification and password each time the user enters a secure area and comparing the user identification and password to stored information in the database entry on the server computer.

12. A method of tracking a user on a computer network, comprising the steps of:

connecting to the computer network from the client computer, the computer network having a plurality of server computers associated with a plurality of content providers;

assigning a token to the user;:

accessing a secure area on a server computer having a predetermined network address;

requesting a user identification from the user;

upon receiving the user identification from the user, providing a database entry that is accessible by using the user identification;

storing the user identification and the token on the client computer, the user identification being passed to the server when the user subsequently accesses the predetermined network address;

receiving from the client computer, both the token and the user identification.

13. The method of claim 12 further including:

accessing a non-secure area on the server computer and assigning a token associated with the user;

storing the token and the user identification on the client computer; and upon subsequent accessing of the non-secure area, receiving, from the client computer, the token and the user identifier.

14. The method of claim 12 further including:

storing a copy of the token in the database entry on the server computer; and upon receiving the token from the client computer, comparing the token to the copy of the token in the database entry.

15. The method of claim 14 further including:

upon first accessing the non-secure area, storing customization information associated with the user in the database entry; and providing customized information to the user if the copy of the token in the database entry matches the token received from the client computer.

16. The method of claim 15 further including:

providing generic, uncustomized information to the user if the copy of the token in the database entry does not match the token received from the client computer.

17. A method of tracking user access of secure and non-secure areas on a network server computer, comprising the steps of:

during first accessing of a non-secure area on the server, storing a globally unique identifier, associated with the user, in local storage on a client computer;

storing information associated with the user's browsing characteristics in a database entry on the server computer using the globally unique identifier as a key to accessing the stored information;

during first accessing a secure area on the server, requesting a user identification and a user password as a prerequisite to entering the secure area;

changing the key to the database entry from the globally unique identifier to the user identification;

storing the user identification and the globally unique identifier in the local storage on the client computer;

storing a copy of the globally unique identifier in the database entry;

during subsequent accessing of the non-secure area, receiving the user identification and the globally unique identifier from the client computer;

accessing the database using the user identification;

comparing the copy of the globally unique identifier in the database entry to the globally unique identifier received from the client computer;

if both globally unique identifiers match, providing personalized content to the user and if both globally unique identifiers do not match, providing generic content to the user.

18. A computer system comprising:

a server computer having memory for storing a database and having secure and non-secure areas;

a client computer having local memory and a display for displaying an interactive environment that allows a user to access the secure and non-secure areas on the server computer;

a communication network for coupling the server computer and the client computer for allowing communication therebetween;

means on the client computer for storing in the local memory a user identification entered by the user and a globally unique identifier and for passing the user identification and globally unique identifier to the server computer when accessing a secure or non-secure area; and means on the server computer for using the user identification as a key to accessing a database entry in the database and for comparing a globally unique identifier stored in the database entry to the globally unique identifier received from the client computer.

19. The computer system of claim 18, further including means for providing personalized content when the globally unique identifier stored in the database entry and the globally unique identifier stored on the client computer match.

20. A method of tracking a user on a client computer as the user accesses secure and non-secure areas on a network server computer, comprising the steps of:

upon first accessing a non-secure area, assigning a token representing the user and using the token as a key for accessing a database entry associated with the user on the server computer;

upon first accessing the secure area, receiving a user identification associated with the user;

replacing the token with the user identification as the key to the database entry;

storing the token, the user identification, and a network address associated with the server computer in local storage on the client computer;

receiving the token and the user identification from the client computer upon subsequent accessing by the user of the network address;

upon first accessing the non-secure or secure areas on the server computer, storing customization information associated with the user in the database entry;

upon subsequent accessing of the non-secure or secure areas, retrieving the customization information stored in the database entry by using the user identification to access the database entry;

returning to the client computer, a document customized according to the customization information;

storing a copy of the token within the database entry;

upon subsequent accessing of the server computer, comparing the copy of the token stored in the database entry to the token received from the client computer;

if the tokens match, returning a document customized according to the customization information to the client computer; and if the tokens do not match, returning a generic, uncustomized document to the client computer.

21. A method of tracking a user on a client computer as the user accesses secure and non-secure areas on a network server computer, comprising the steps of:

upon first accessing a non-secure area, assigning a token representing the user and using the token as a key for accessing a database entry associated with the user on the server computer;

upon first accessing the secure area, receiving a user identification associated with the user;

replacing the token with the user identification as the key to the database entry;

during first accessing of the server computer, obtaining customization information from the user;

storing the customization information in the database entry;

prior to accessing the secure area:
   (a) receiving the token from the client computer;
   (b) accessing the database entry on the server computer using the token; and
   (c) returning a document to the client computer that is customized in accordance with the customization information stored in the database entry;

after accessing the secure area:
   (a) receiving the user identification and the token from the local storage on the client computer;
   (b) accessing the database entry on the server computer using the user identification; and
   (c) checking the token received from the client computer by comparing the token to information stored within the database entry.

22. The method of claim 21 further including:

upon first accessing the private area, requesting registration information and storing information in the database entry indicating that the user has registered.

23. The method of claim 22 further including:

upon subsequent accessing the private area, checking the database entry to verify that the user previously registered, and if the user already registered, allowing the user to access the private area without further registration.

24. A method of tracking a user on a computer network, comprising the steps of:

connecting to the computer network from the client computer, the computer network having a plurality of server computers associated with a plurality of content providers;

accessing a secure area on a server computer having a predetermined network address;

requesting a user identification from the user;

upon receiving the user identification from the user, providing a database entry that is accessible by using the user identification;

storing the user identification on the client computer, the user identification being passed to the server when the user subsequently accesses the predetermined network address;

accessing a non-secure area on the server computer and assigning a token associated with the user;

storing the token and the user identification on the client computer; and upon subsequent accessing of the non-secure area, receiving, from the client computer, the token and the user identifier.

25. A method of tracking a user on a client computer as the user accesses secure and non-secure areas on a network server computer, comprising the steps of:

upon first accessing a non-secure area, assigning a token representing the user and using the token as a key for accessing a database entry associated with the user on the server computer;

upon first accessing the secure area, receiving a user identification associated with the user;

replacing the token with the user identification as the key to the database entry;

storing customization information associated with the user in the database entry;

storing a copy of the token within the database entry and comparing the copy with a token received from the client computer; if the tokens match, returning a document customized according to the customization information; and if the tokens do not match, returning a generic, uncustomized document to the client computer.

* * * * *

UNITED STATES PATENT AND TRADEMARK OFFICE
CERTIFICATE OF CORRECTION

PATENT NO. : 5,966,705

DATED : October 12, 1999

INVENTOR(S) : Koneru et al.

It is certified that error appears in the above-identified patent and that said Letters Patent is hereby corrected as shown below:

Column 1, line 59, "are a" should read --area--
Column 3, line 61, "in put" should read --input--

Column 10, line 15, "user::" should read --user;--

Signed and Sealed this

Twenty-seventh Day of March, 2001

Attest:

NICHOLAS P. GODICI

Attesting Officer

*Acting Director of the United States Patent and Trademark Office*